United States Patent Office 3,095,522
Patented June 25, 1963

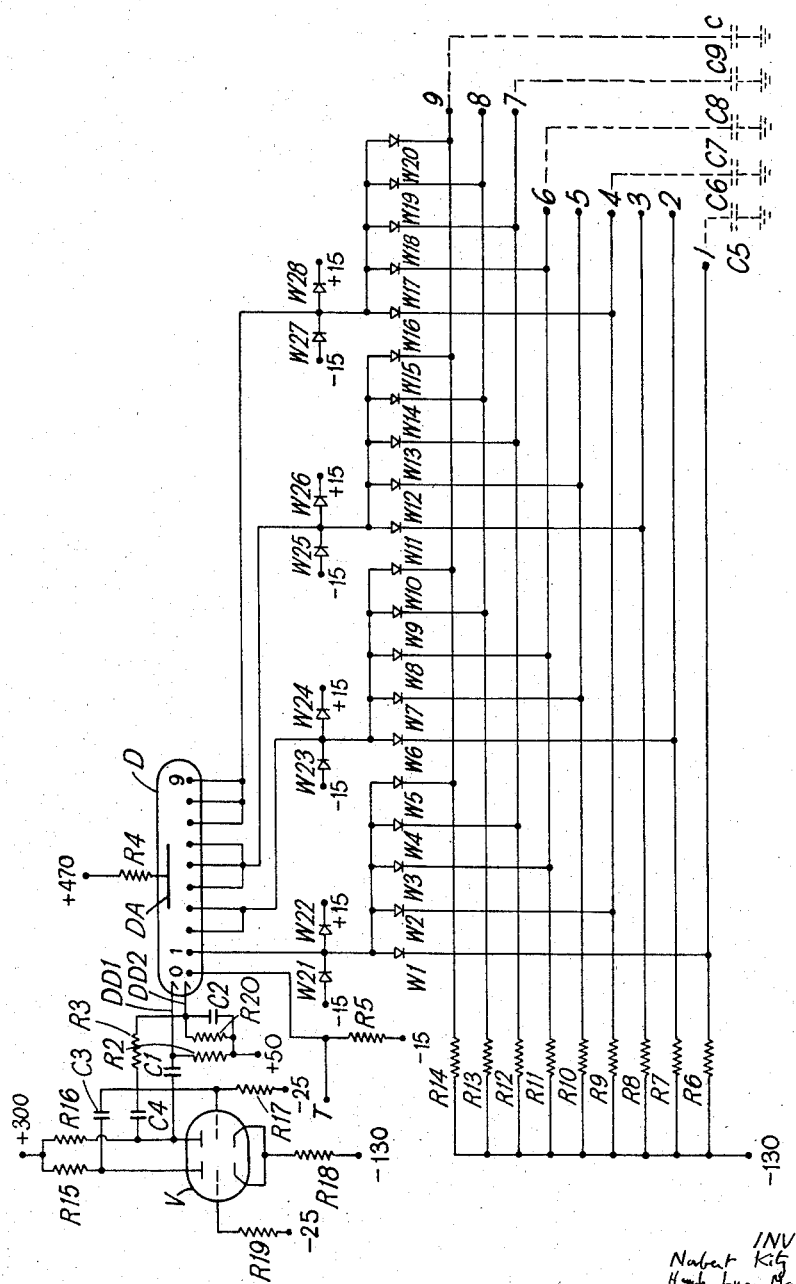

3,095,522
MULTIPLE-OUTPUT GENERATOR SYSTEM
Norbert Kitz, Hugh Lyon Mansford, and John George Lloyd, London, England, assignors to Bell Punch Company Limited, London, England, a British company
Filed July 13, 1960, Ser. No. 42,528
Claims priority, application Great Britain July 16, 1959
9 Claims. (Cl. 315—84.6)

This invention relates to pulse generators and provides a pulse generator having a plurality of output terminals at which different numbers of pulses appear during a cycle of operation of the generator.

The invention consists in a multi-output pulse generator including a multi-cathode electronic stepping tube, means for driving said stepping tube and a plurality of output terminals each coupled to a different number of said cathodes.

A multi-output pulse generator according to the invention may, for example, be used in a calculating machine for providing pulses which operate counting devices. In a decimal system the maximum number of pulses required from such a pulse generator will normally be nine or ten and, in this case, the electronic stepping tube may, for example, have ten cathodes. When the maximum number of pulses required in a cycle is nine, one cathode of a ten-cathode stepping tube may be used for providing a timing pulse for other parts of the equipment.

Methods of driving multi-cathode electronic stepping tubes are well-known and may, for example, comprise an oscillator followed by a driving amplifier which provides the necessary phase-displaced outputs for application to the two or three drive electrodes of the steppings tube. The anode of the electronic stepping tube is connected to a source of positive potential and the cathodes are connected to one or more sources of negative potential.

In a system according to the invention each output terminal is preferably connected to one or more of the cathodes of the electronic stepping tube through one or more asymmetrically conducting devices and to a source of negative potential through a resistor.

The cathodes may be divided into groups. In this case one group will consist of a single cathode and the cathodes in each of the remaining groups that contain more than one cathode will be inter-connected. Each group of cathodes is preferably connected to a plurality of output terminals through individual asymmetrically conducting devices. In the particular case referred to above the stepping tube has ten cathodes of which nine are included in said groups and of which the tenth is connected to a further output terminal. In this case, in addition to the group which contains only one cathode, there will preferably be a second group containing two cathodes and third and fourth groups each containing three cathodes.

The arrangement will normally be such that each group of cathodes is connected to the source of negative potential through a plurality of asymmetrically conducting devices and a plurality of resistors.

A pulse generator of the kind hereinbefore defined may be used in equipment, for example a calculating machine, in which there is a considerable capacitive load on the output terminals of the pulse generator. In such circumstances the rise time and decay time of the pulses appearing on the output terminals may be too long for some purposes.

To reduce the decay time of the pulses, each group of cathodes may be connected to a further source of negative potential (said further source being less negative than the first-mentioned source of negative potential) through an asymmetrically conducting device so directed that the potential swing of the group of cathodes in the negative direction is limited substantially to the potential of said further source.

To reduce the rise time of the pulses, each group of cathodes may be connected to a source of positive potential through an asymmetrically conducting device, the total effective resistance between each cathode and the first-mentioned source of negative potential being such (for example between 100,000 and 200,000 ohms) that, in the absence of the asymmetrically conducting device, the cathode on which the glow was resting would rise to a potential more positive than that of the source of positive potential connected to that cathode, and the asymmetrically conducting devices being so directed that the potential swing of each group of cathodes in the positive direction is limited substantially to the potential of the positive source connected thereto.

The potential of the first-mentioned negative source may, for example, be between —100 and —150 volts. The potential of the further negative source may, for example, be between —10 and —25 volts and the potential of the positive source may be, for example, between +10 and +25 volts.

One embodiment of the invention will now be described with reference to the accompanying diagrammatic drawing.

The multi-output pulse generator illustrated in the drawing includes a ten-cathode electronic stepping tube D driven by a double triode valve V. The anode DA of the stepping tube D is connected through a resistor R4 to a potential of +470 volts. The two drive electrodes DD1 and DD2 of the stepping tube D are connected through coupling circuits to the anode of the right-hand triode of the valve V. The coupling circuit for the drive electrode DD1 consists of a capacitor C1 and a resistor R2 which supplies a bias potential of +50 volts to the drive electrode. The coupling circuit for the drive electrode DD2 consists of a coupling capacitor C4, an integrating circuit consisting of a resistor R3 and a capacitor C2, and a bias resistor R20.

The valve V is arranged as a cathode-coupled multivibrator circuit. The two anodes of the valve V are connected through respective resistors R15 and R16 to a potential of +300 volts and the two cathodes are connected through a common resistor R18 to a potential of —130 volts.

The control grid of the left-hand triode of the valve V is connected to a potential of —25 volts through a resistor R19. The anode of the left-hand triode is coupled through a capacitor C3 to the grid of the right-hand triode which is also connected to a potential of —25 volts through a resistor R17.

The cathode 0 of the tube D is connected to a terminal T and through a resistor R5 to a potential of —15 volts. The cathode 1 of the tube D is connected through rectifiers W1, W2, W3, W4 and W5 and resistors R6, R9, R11, R12 and R14 to a potential of —130 volts. The junction of the rectifier W1 and the resistor R6 is connected to a terminal 1; the junction of the rectifier W2 and the resistor R9 is connected to a terminal 4; the junction of the rectifier W3 and the resistor R11 is connected to a terminal 6; the junction of rectifier W4 and the resistor R12 is connected to a terminal 7; and the junction of the rectifier W5 and the resistor R14 is connected to a terminal 9. In addition the cathode 1 is connected through a rectifier W21 to a potential of —15 volts, and through a rectifier W22 to a potential of +15 volts. The cathodes 2 and 3 of the valve D are connected through rectifiers W6, W7, W8, W9 and W10 and resistors R7, R10, R11, R13 and R14 to a potential of —130 volts. The junctions of the respective rectifiers and resistors are connected to output terminals 2, 5, 6, 8 and 9. Further, the cathodes 2 and 3 are connected through a rectifier W23 to a potential of −15 volts and through a rectifier W24 to a potential of +15 volts. The cathodes 4, 5 and 6 of the tube D are connected through rectifiers W11, W12, W13, W14 and W15 and resistors R8, R10, R12, R13 and R14 to a potential of −130 volts. The junctions of the respective rectifiers and resistors are connected to output terminals 3, 5, 7, 8 and 9. Further the cathodes 4, 5 and 6 are connected through a rectifier W25 to a potential of −15 volts, and through a rectifier W26 to a potential of +15 volts. The cathodes 7, 8 and 9 of the tube D are connected through rectifiers W16, W17, W18, W19 and W20 and resistors R9, R11, R12, R13 and R14 to a potential of −130 volts. The junctions of the respective rectifiers and resistors are connected to output terminals 4, 6, 7, 8 and 9. Further the cathodes 7, 8 and 9 are connected through a rectifier W27 to a potential of −15 volts and to a rectifier W28 to a potential of +15 volts.

Thus it will be seen that the output terminal 1 is coupled to the cathode 1; the output terminal 2 is coupled to the cathodes 2 and 3; the output terminal 3 is coupled to the cathodes 4, 5 and 6; the output terminal 4 is coupled to the cathodes 1, 7, 8 and 9; the output terminal 5 is coupled to the cathodes 2, 3, 4, 5 and 6; the output terminal 6 is coupled to the cathodes 1, 2, 3, 7, 8 and 9; the output terminal 7 is coupled to the cathodes 1, 4, 5, 6, 7, 8 and 9; the output terminal 8 is coupled to the cathodes 2, 3, 4, 5, 6, 7, 8 and 9; and the output terminal 9 is coupled to the cathodes 1, 2, 3, 4, 5, 6, 7, 8 and 9.

As each of the output terminals 1, 2 and 3 is connected to only one group of cathodes, it is normally possible to omit the rectifiers W1, W6 and W11, the output terminals 1, 2 and 3 being connected directly to their respective groups of cathodes.

In operation the valve V provides a train of phase-displaced pulses to the drive electrodes DD1 and DD2 which cause a glow to be stepped successively along the cathodes of the tube D. As a result one pulse appears on terminal 1 during each cycle of operation of the generator, two pulses appear on terminal 2, and so on up to terminal 9 on which nine pulses appear. In addition a timing pulse appears on the terminal T during each cycle.

When the glow resides, for example, on the cathode 0, current flows through the resistors R4 and R5 with the result that the potential of the terminal T is raised. When the glow leaves the cathode 0, the potential of the terminal T drops to the −15 volts applied to it through the resistor R5. Similarly, when the glow resides on the cathode 1, current flows through the resistor R4 and through the resistors R6, R9, R11, R12 and R14 with the result that the potential of the terminals 1, 4, 6, 7 and 9 is raised. However, when the potential of the cathode 1 exceeds +15 volts the rectifier W22 becomes conductive and accordingly any further rise in the potential of the cathode is prevented. When the glow leaves the cathode 1, the potential of the terminals 1, 4, 6, 7 and 9 commences to drop towards the −130 volts applied thereto through the respective resistors R6, R9, R11, R12 and R14. However, when the potential of any of these terminals drops below −15 volts, the rectifier W21 and the respective one of the rectifiers W1, W2, W3, W4 and W5 become conductive so that any further fall in the potential of the terminal is prevented.

The output terminals 1 to 9 of the pulse generator are assumed to be connected to capacitive loads and these loads are indicated in the case of the terminals 1, 4, 6, 7 and 9 by capacitors C5, C6, C7, C8 and C9 respectively. These capacitive loads tend to increase the rise time and the decay time of the pulses appearing at the respective terminals as a result of the movement of the glow along the cathodes of the tube D. However, these times are kept short by the circuit arrangement illustrated. The normal cathode circuit for a multi-cathode electronic stepping tube is shown in the case of the cathode 0 and consists of a comparatively low resistance (for example 33,000 ohms) connected to a comparatively low negative potential (−15 volts in the example illustrated). The cathode 1, however, is connected to a comparatively large negative potential (−130 volts) through a comparatively high resistance. If the forward resistances of the rectifiers W1 to W5 can be ignored, this resistance consists of the effective resistance of the five resistors R6, R9, R11, R12 and R14 connected in parallel. Each of these resistors may, for example, have a resistance of 680,000 ohms with the result that the effective resistance is 136,000 ohms, i.e. approximately four times the resistance of the resistor R5. The large value of the effective cathode resistance would, in the absence of the rectifier W22, make the final value of the positive potential on the cathode 1 when the glow is resting on that cathode, higher than the potential on the cathode 0, when the glow is resting on that cathode, but, since the time constant of the circuit remains the same, the rise in the voltage will be steeper in the case of the cathode 1 than in the case of the cathode 0. Accordingly by limiting the potential to a small fraction of the value it would otherwise reach by means of the rectifier W22 it is possible to produce a pulse having a very short rise time. Similarly the comparatively high negative potential to which the cathode 1 is connected through the resistors R6, R9, R11, R12 and R14 would, in the absence of the rectifier W21, cause the final potential of the cathode 1, when the glow has left the cathode, to be considerably more negative than in the case of cathode 0. As the charging current of each of the capacitors C5 to C9 follows an exponential curve, the initial negative swing of the potential of each of the output terminals will be faster than in the case of the cathode 0. As the swing is limited to −15 volts by the rectifier W21, only the first initial part of the swing is used and accordingly the decay time of the pulses is made very short.

What we claim as our invention and desire to secure by letters patent of the United States is:

1. A multi-output pulse generator comprising a multi-cathode electronic stepping tube, means for driving said stepping tube, a plurality of output terminals each coupled to a different number of said cathodes, a plurality of first asymmetrically conducting devices adapted to limit the potential swing of said cathodes in the negative direction, and a plurality of second asymmetrically conducting devices adapted to limit the potential swing of said cathodes in the positive direction.

2. A multi-output pulse generator comprising a multi-cathode electronic stepping tube, means for driving said stepping tube, a plurality of output terminals, a first source of negative potential, a plurality of resistors respectively connecting the output terminals to said first source of negative potential, means interconnecting predetermined ones of said cathodes into groups, individual first asymmetrically conducting devices connecting each group of cathodes to a plurality of the output terminals, a second source of negative potential which is less negative than the first source of negative potential, and second asymmetrically conducting devices one connecting each group of cathodes to the second source of negative potential, each of said second asymmetrically conducting devices being so directed that the potential swing of each of the cathodes in the negative direction is limited substantially to the potential of said second source.

3. A pulse generator according to claim 2, wherein the potential of the said first negative source is between −100 and −150 volts and the potential of said second negative source is between −10 and −25 volts.

4. A multi-output pulse generator comprising a multi-cathode electronic stepping tube, means for driving said stepping tube, a plurality of output terminals, a source of negative potential, a plurality of resistors respectively connecting the output terminals to said source of negative potential, means interconnecting predetermined ones of said cathodes into groups, individual first asymmetrically conducting devices connecting each group of cathodes to a plurality of output terminals, a source of positive potential, and a plurality of second asymmetrically conducting devices one connecting each group of cathodes to the source of positive potential, wherein the total effective resistance between each cathode and the source of negative potential is such that in the absence of the second asymmetrically conducting devices the cathode on which the glow was resting would rise to a potential more positive than that of the source of positive potential, and wherein the second asymmetrically conducting devices are so directed that the potential swing of each of the cathodes in the positive direction is limited substantially to the potential of the positive source.

5. A pulse generator according to claim 4, wherein the potential of the positive source is between +10 and +25 volts.

6. A pulse generator according to claim 4, wherein the total effective resistance between each cathode and the source of negative potential is between 100,000 and 200,000 ohms.

7. A multi-output pulse generator comprising a multi-cathode electronic stepping tube, means to connect said cathodes together into a plurality of groups each including at least one cathode, at least one of said groups including more than one cathode, a first source of negative potential, a plurality of groups of series combinations, each said combination including an asymmetrically conducting device and a resistive element, the combinations of each of said last-named groups being connected between the cathodes of a separate one of said first-named groups and said source with the asymmetrically conducting device between the resistive element and the cathodes, a second source of negative potential less negative than said first source, and a separate asymmetrically conducting device connecting the cathodes of each of said first-named groups to said second source, said last-named devices being poled to conduct positive charges more easily in the direction from said second source to said cathodes than in the opposite direction.

8. A multi-output pulse generator comprising a multi-cathode electronic stepping tube, means to connect said cathodes together into a plurality of groups each including at least one cathode, at least one of said groups including more than one cathode, a source of negative potential, a plurality of groups of series combinations, each said combination including an asymmetrically conducting device and a resistive element, the combinations of each of said last-named groups being connected between the cathodes of a separate one of said first-named groups and said source with the asymmetrically conducting device between the resistive element and the cathodes, a source of positive potential, and a separate asymmetrically conducting device connecting the cathodes of each of said first-named groups to said source of positive potential, said last-named devices being poled to conduct positive charges more easily in the direction from said cathodes to said positive source than in the opposite direction.

9. A multi-output pulse generator comprising a multi-cathode electronic stepping tube, said tube having an anode, said generator further comprising a source of potential difference, means to connect said cathodes together into groups each including at least one cathode, at least one of said groups including more than one cathode, a plurality of groups of series combinations, each said combination including an asymmetrically conducting device and a resistive element, the combinations of each of said last-named groups being connected between the cathodes of a separate one of said first-named groups and the negative terminal of said source with the asymmetrically conducting device between the resistive element and the cathodes, means connecting the anode of said tube to the positive terminal of said source, a source of intermediate potential, and a separate asymmetrically conducting device connected between the cathodes of each of said first-named groups and said intermediate potential, said last-named devices being poled to conduct positive charges more easily in the direction from said cathodes to said intermediate source than in the opposite direction, said intermediate potential being lower than the fraction of said potential difference, measured from the negative terminal of said first-named source, given by the ratio of the resistance between the cathodes of any of said first-named groups and said negative terminal to the resistance from the positive terminal of said source to said negative terminal via said tube and the cathodes of any of said first-named groups.

References Cited in the file of this patent
UNITED STATES PATENTS

| | | |
|---|---|---|
| 2,700,146 | Bachelet | Jan. 18, 1955 |
| 2,851,534 | Bray | Sept. 9, 1958 |
| 2,898,513 | Townsend et al. | Aug. 4, 1959 |
| 2,926,250 | Bivens | Feb. 23, 1960 |